United States Patent [19]
Kikuchi

[11] Patent Number: 6,062,937
[45] Date of Patent: May 16, 2000

[54] ASSEMBLY BLOCK FOR TEACHING MATERIAL, PLAYTHING, ETC

[75] Inventor: Hideo Kikuchi, Kobe, Japan

[73] Assignee: System Watt Co., Ltd., Kobe, Japan

[21] Appl. No.: 09/185,943

[22] Filed: Nov. 4, 1998

[30] Foreign Application Priority Data

Nov. 4, 1997 [JP] Japan ................................... 9-301870

[51] Int. Cl.[7] .................................................. A63H 33/04
[52] U.S. Cl. ............................. 446/91; 446/92; 446/484
[58] Field of Search .................................... 434/208, 224, 434/365, 379, 393; 446/91, 175, 219, 484, 485; 84/670

[56] References Cited

U.S. PATENT DOCUMENTS

| | | | |
|---|---|---|---|
| 3,237,341 | 3/1966 | Janning | 446/91 |
| 3,696,548 | 10/1972 | Teller | 446/91 |
| 4,894,040 | 1/1990 | Bach | 446/91 |
| 4,936,185 | 6/1990 | Yamaguchi | 84/670 |

FOREIGN PATENT DOCUMENTS 10-108985  4/1998  Japan ............................. A63H 33/08

Primary Examiner—Robert A. Hafer
Assistant Examiner—Kurt Fernstrom
Attorney, Agent, or Firm—Marshall, O'Toole, Gerstein, Murray & Borun

[57] ABSTRACT

An assembly block for a teaching material and a plaything ensures connection of wire lines at all possible link positions at which the assembly block is linked and in all possible link directions in which the assembly block is linked. Four link recess portions 12 are formed in a link surface 11a of an assembly block 10, and a round connector 13 is disposed at the center of the link surface 11a. Bottom plates of steel are disposed at the bottom of the link recess portions 12. Magnets are inserted inside the link recess portions 12 with the link recess portions 12 opposed with each other, whereby two assembly blocks are linked to each other. The connector 13, disposed for electrical connection with the connector 13 of another assembly block, comprises connection terminals which are disposed in a concentric arrangement on an insulation plate. When assembly blocks are linked to each other, the connection terminals which are disposed in a concentric arrangement of the connector 13 are electrically connected with each other. Since the connection terminals are arranged in a concentric arrangement, whichever direction the assembly blocks are linked in, electrical connection is established without fail.

11 Claims, 12 Drawing Sheets

ASSEMBLY BLOCK FOR TEACHING MATERIAL, PLAYTHING, ETC

BACKGROUND OF THE INVENTION

1. Field of the Invention

The present invention relates to an assembly lock which is used as a teaching material, a plaything or the like, and more particularly, to an assembly block which provides a teaching material, a plaything or the like and transfers electric power and information with other assembly blocks through a power source line, a network line, etc.

2. Description of the Background Art

A teaching material, a plaything or the like which is formed by assembling a plurality of assembly blocks is already known. However, a conventional assemble-type plaything or the like provides only simple motions, and has a great disadvantage that it cannot realize complex control.

A patent application covering an assemble-type plaything system which solves this problem has been already filed (Japanese Patent Application Laid-Open patent publication No. 10-108985). In the assemble-type plaything system disclosed in this patent application, respective assembly blocks are connected to each other by a power source line and a network line so that electric power is supplied through the power source line while external information, control information and the like are transferred through the network line. Such a structure which comprises the power source line and the network line, by means of very simple connection of the lines, realizes various types of operations and complex control.

However, since a requirement of an assemble-type teaching material, plaything or the like is a capability of linking assembly blocks to each other at various positions and in various directions, in the case of the assemble-type plaything as described above which requires the transfer of electric power, information and the like between the assembly blocks, it is difficult to ensure a reliable wire connection which allows transfer of electric power, information and the like at all possible like positions and in all possible link directions.

The present invention aims to solve such a problem with assembly blocks, and accordingly, an object of the present invention is to provide an assembly block for a teaching material, a plaything or the like which permits a reliable wire connection between assembly blocks at all possible link positions and in all possible link directions.

SUMMARY OF THE INVENTION

There are many types of assembly blocks to which the present invention is applied, such as a drive block which mounts a motor or the like, a power source block which contains a battery for supplying electric power to other assembly blocks and a sensor block which senses light, sound, distance, force, temperature, etc. By combining the assembly blocks which have these functions, one plaything is assembled.

An assembly block according to the present inventions is linked at a link surface to other assembly block by linking means. Further, the assembly block according to the present invention comprises at least two wire lines which have a predetermined function such as transfer of electric power, information, etc., and a connector for connecting the wire lines inside the assembly block to wire lines of other assembly blocks. At least two wire lines are disposed to each assembly block, and the wire lines are connected to connection terminals of the connector. In the assembly block according to a preferred embodiment of the present invention, the connector comprises a plurality of connection terminals which are arranged on concentric circles. With such a structure in which the plurality of connection terminals of the connector are arranged on concentric circles, whichever link direction between assembly blocks there may be, it is possible to connect the connection terminals with each other.

According to another preferred embodiment of the present invention, the assembly block comprises wiring means. The wiring means, determining which function of wire lines of other assembly blocks the wire lines are connected with, connects the wire lines in the assembly block. By means of such wiring means, whichever link direction between assembly blocks there may be and whichever link positions between assembly blocks there may be, it is possible to correctly recognize the functions of the wire lines which are disposed within the assembly blocks and to connect the wire lines with each other.

The structures as described above are applicable to an assembly block which comprises one or more power source lines and one or more network line. With either structure, it is possible to transfer electric power, information and the like at all possible link positions and in all possible link directions without damaging sophisticated functions of respective assembly blocks.

DESCRIPTION OF THE PREFERRED EMBODIMENTS

Figure 1:
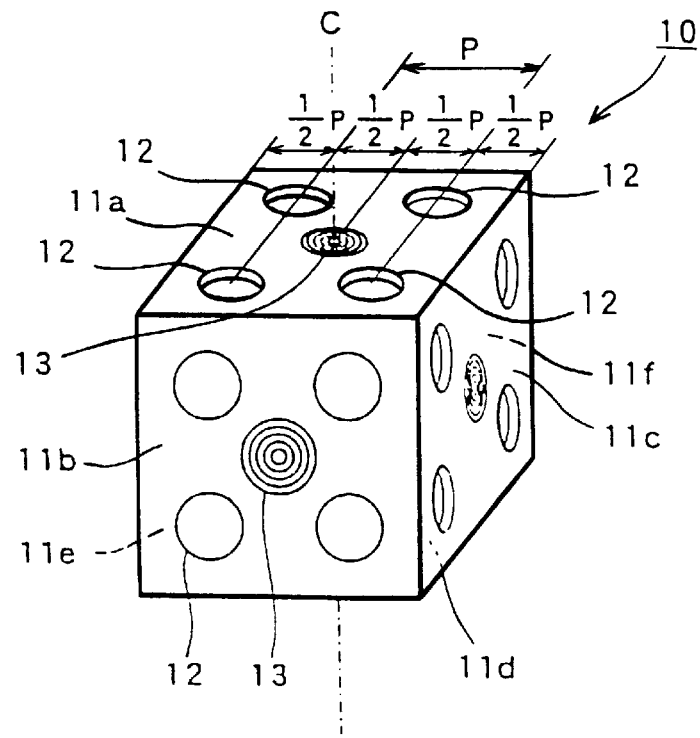
FIG. 1 is a perspective view of an assembly block for a teaching material, a plaything or the like according to a preferred embodiment of the present invention.

Now, preferred embodiments of the present invention will be described with reference to the associated drawings. FIG. 1 is a perspective view of an assembly block for a teaching material, a plaything or the like according to a preferred embodiment of the present invention. The assembly block according to the preferred embodiment 10 has a cubic shape, and a motor, a battery and the like are disposed within the assembly block 10 in accordance with a function of the assembly block 10. Any one of six square surfaces of the assembly block 10 is capable of functioning as a link surface. A link surface 11a shown in FIG. 1 includes four link recess portions 12, 12 . . . Further, at the center of the link surface 11a, that is, at an intersection of diagonal lines of the square, a round connector 13 is disposed. In a direction along one side of the link surface 11a, assuming that a center-to-center distance between the adjacent link recess portions 12 is P, as shown in FIG. 1, a distance between an edge portion of the link surface 11a and the center of each link recess portion 12 is P/2 and a distance between the center of each link recess portion 12 and the center of the connector 13 is also P/2. This relationship regarding the distances is similar in a direction along the other side. In addition, other link surfaces 11b through 11f as well provide such a relationship regarding distances which is similar to that with the link surface 11a.

Figure 2:
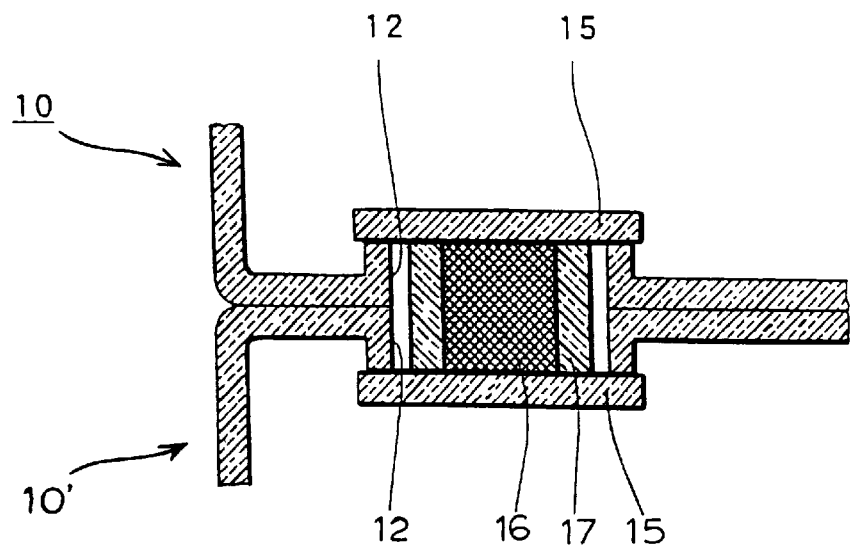
FIG. 2 is a cross-sectional view of two assembly blocks as they are linked to each other.

Next, a structure of the link recess portions 12 will be described. FIG. 2 shows cross-sectional surfaces of two linked assembly blocks 10 and 10'. The assembly blocks 10 and 10' are the same as the block which is shown in FIG. 1. In this embodiment, the assembly blocks 10 and 10' are linked to each other at such a position that the link recess portions 12 of the assembly blocks 10 and 10' are faced with each other. Steel bottom plates 15 and 15 are disposed at the bottom of the assembly blocks 10 and 10', respectively. In a space which is created by the opposed link recess portions 12, column-like magnets 16 and steel cylinders 17 surrounding the associated magnets 16 are disposed. In this embodiment, the magnets 16 and the cylinders 17 are attracted by magnetic force to the bottom plates 15 and 15 of the respective link recess portions 12 and 12, whereby the two assembly blocks 10 and 10' are linked to each other. Hence, in this embodiment, the link recess portions 12, the bottom plates 15, the magnets 16 and the cylinders 17 form linking means.

Figure 3A:
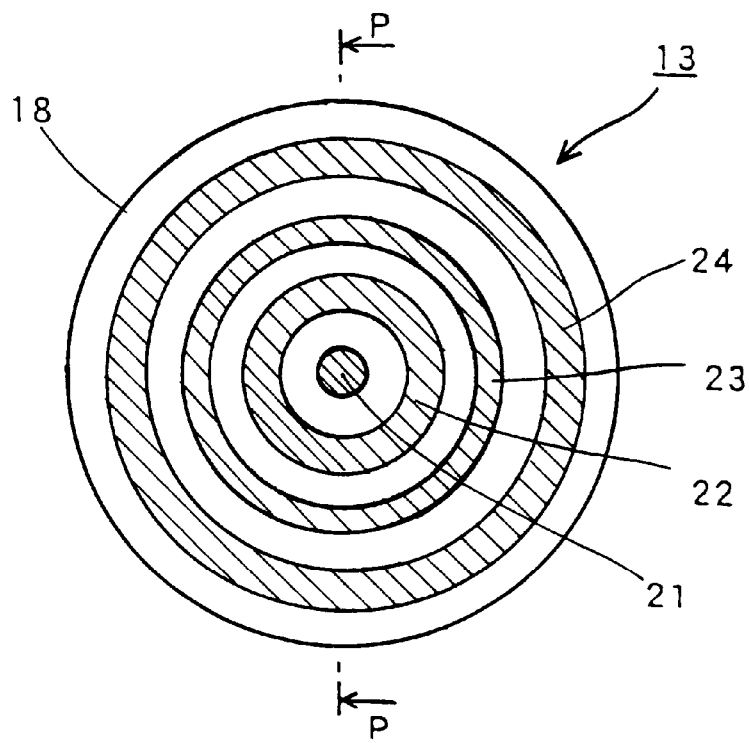
FIG. 3(a) is a plan view of a connector.
Figure 3B:
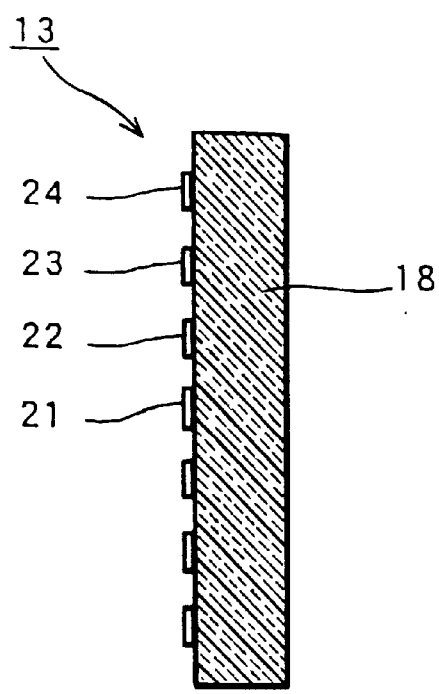
FIG. 3(b) is a perspective cross-sectional view of FIG. 3(a) taken along a line P—P which is denoted at arrows.

Next, a structure of the connector 13 will be described. FIG. 3(a) is a plan view of the connector 13, and FIG. 3(b) is a perspective cross-sectional view of FIG. 3(a) taken along a line P—P which is denoted at arrows. The connector 13 according to the preferred embodiment is to be electrically connected with the connector 13 of the other assembly block. As shown in FIG. 3(a), the connector 13 comprises four gold-plated connection terminals 21, 22, 23 and 24 which are arranged to define a circle (i.e., in a concentric arrangement) on an insulation plate 18. To use the connector 13, the connector 13 is fit into a hole which is formed in the link surface 11a of the assembly block 10. To the connection terminals 21, 22, 23 and 24, from the back surface side of the connection terminals, that is, from inside the assembly block 10, four wire lines not shown are electrically connected. In this embodiment, the wire lines which are connected to the connection terminals 21 and 22 are used as power source lines for supplying electric power, which the wire lines which are connected to the connection terminals 23 and 24 are used as network lines for transferring information between other assembly blocks.

The connector 13 of the assembly block 10, when linked to other assembly block 10' as shown in FIG. 2, is faced with and abuts the connector 13 of the assembly block 10'. In a condition that the connector 13 is in direct contact with the connector 13 of the assembly block 10', as shown in FIG. 3(a), the four connections terminals 21, 22, 23 and 24 which are arranged in a concentric arrangement abut the connection terminals 21, 22, 23 and 24 of the connector 13 of the assembly block 10', respectively, whereby the four wire lines which are disposed within the assembly block 10 are electrically connected with the four wire lines which are disposed within the assembly block 10'. The connection terminal 21 of the connector 13 of the assembly block 10 is electrically connected with all of the connection terminals 21 of five connectors 13 of the other link surfaces 11b through 11f. In a similar manner, the remaining connection terminals 22, 23 and 24 are electrically connected with the connection terminals 22, 23 and 24, respectively, of all the other five connectors 13, such that the connection terminals denoted at the same reference symbol are connected with each other. Further, if a plurality of the assembly blocks according to the preferred embodiment are linked to each other, the connection terminals 21 of all the connectors 13 of all the linked assembly blocks are electrically connected with each other, and in a similar manner, the connection terminals 22, 23 and 24 are electrically connected with each other such that the connection terminals denoted at the same reference symbol are connected with each other.

Linking of assembly blocks as described above may be realized in a direction which is revolved 90 degrees each around a center line C in FIG. 1. Since the connection terminals 21, 22, 23 and 24 of the connector 13 are arranged in a concentric arrangement in this embodiment, even when the assembly block 10 is rotated 90 degrees each, electrical connection with the connection terminals 21, 22, 23 and 24 of other assembly block is ensured.

Figure 4:
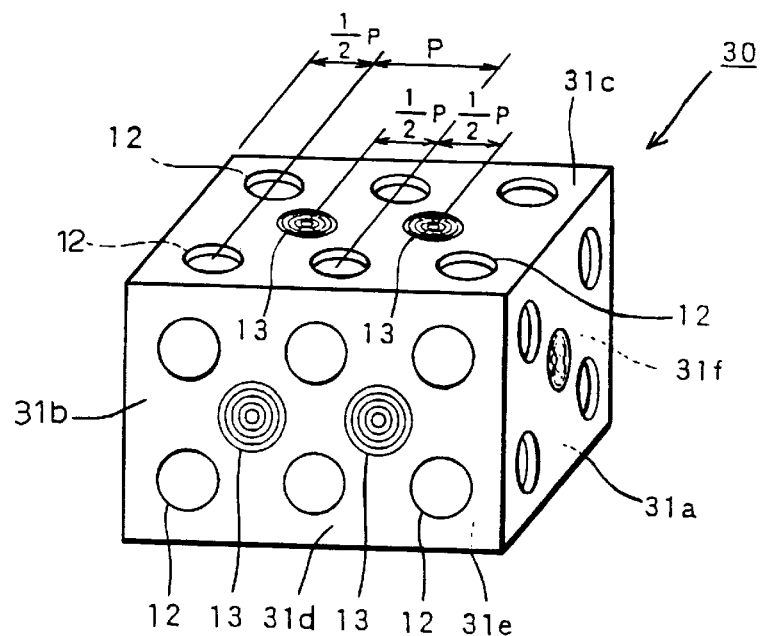
FIG. 4 is a perspective view of an assembly block according to another preferred embodiment of the present inventions.
Figure 5:
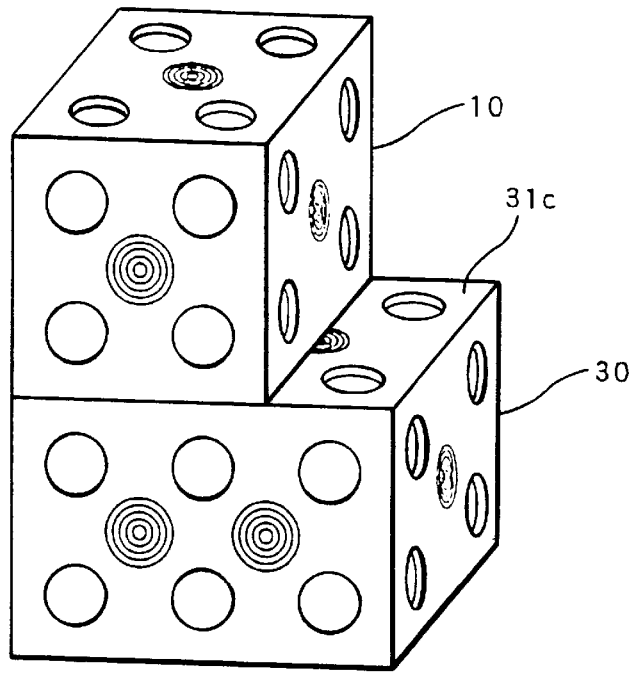
FIG. 5 is a perspective view showing the assembly block of FIG. 4 as it is linked to the assembly block of FIG. 1.

FIG. 4 is a perspective view of an assembly block 30 according to another preferred embodiment of the present invention. The assembly block 30 has a rectangle shape, and comprises two opposite square link surfaces 31a and 31b and four rectangle link surfaces 31c through 31f. The link recess portions 12 and the connector 13 are disposed in the square link surface 31a, with the number and the arrangement of the link recess portions 12 exactly the same as in the case of the assembly block 10 which is shown in FIG. 1. On the other hand, the length of the longer sides of the rectangle link surface 31c is 1.5 times as long as the length of the sides of the link surface 11a of the assembly block 10 of FIG. 1. As shown in FIG. 4, six link recess portions 12 and two connectors 13 are disposed in the link surface 13c. Since distances with respect to the link recess portions 12 and the connectors 13 in the assembly block 30 are set similar to those in FIG. 1, it is possible to link the assembly block 30 to the assembly block 10 at any one of the link surfaces 11a through 11f. FIG. 5 shows a case where the assembly block 30 of FIG. 4 and the assembly block 10 of FIG. 1 are linked to each other. The connector 13 on the left-hand side of the top ink surface 31c shown in FIG. 4 is linked to the connectors 13 of the bottom link surface 11d which are shown in the lower side in FIG. 1. Although the assembly block 10 is linked to the assembly block 30 on the left-hand side to the link surface 31c in FIG. 5, the assembly block 10 may be linked on the right-hand side to the link surface 31c. In that case, the connector 13 on the right-hand side of the top link surface 31c shown in FIG. 4 is linked to the connectors 13 of the bottom link surface 11d which are shown in the lower side in FIG. 1.

Figure 6A:
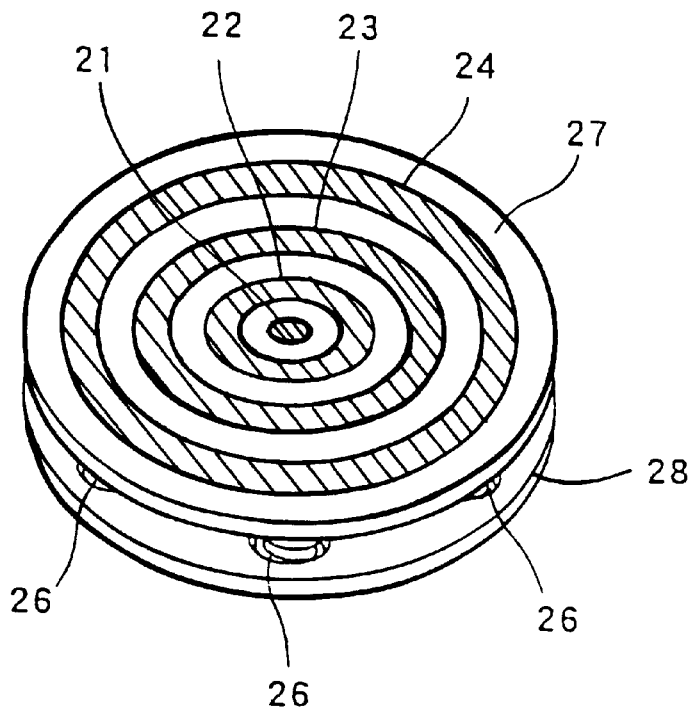
FIGS. 6(a) and 6(b) are a perspective view and a cross-sectional view, respectively, of another preferred embodiment of the connector.
Figure 6B:
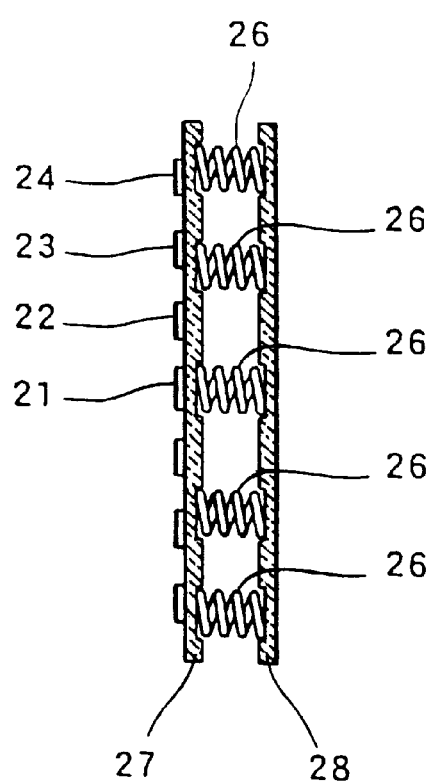

FIGS. 6(a) and 6(b) are a perspective view and a cross-sectional view, respectively, of another preferred embodiment of the connector. The connector according to this embodiment comprises two disk-shaped insulation plates 27 and 28 which are linked to each other by a plurality of springs 26. Connection terminals 21, 22, 23 and 24 are arranged to define a circle (i.e., in a concentric arrangement) on the insulation plate 27. The springs 26 press the connector according to this embodiment against a connector of another assembly block with the assembly block linked to the other assembly block, and therefore, it is possible to establish good electrical connection of the connection terminals 21, 22, 23 and 24 respectively with each other.

Figure 7A:
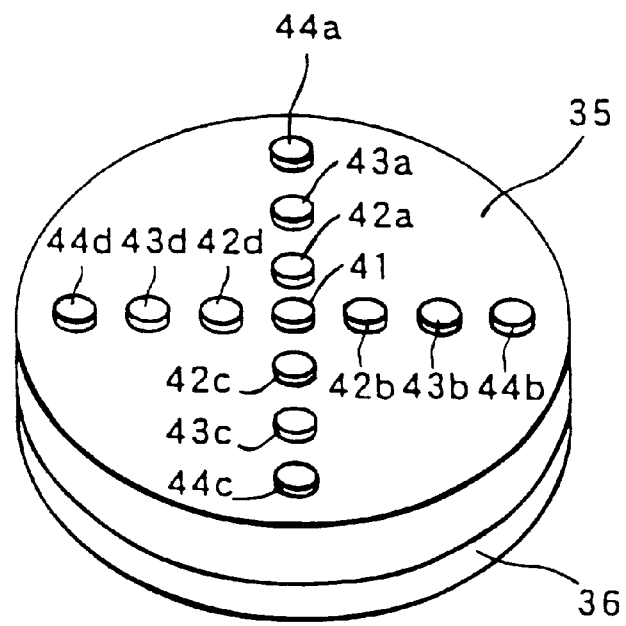
FIGS. 7(a) and 7(b) are a perspective view and a cross-sectional view, respectively, of still another preferred embodiment of the connector.
Figure 7B:
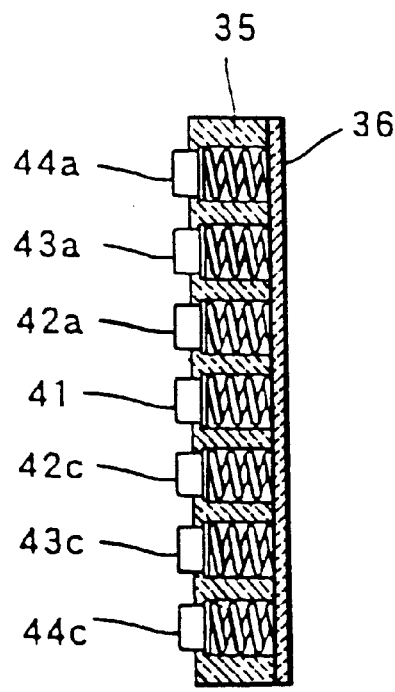

FIGS. 7(a) and 7(b) are a perspective view and a cross-sectional view, respectively, of still another preferred embodiment of the connector. The connector according to this embodiment comprises an insulation case 35 and a back surface plate 36, and a number of connection terminals protrude through holes which are formed in the insulation case 35. The connection terminals are formed by a connection terminal 41 which is located at the center, connection terminals 42a, 43a and 44a, connection terminals 42b, 43b and 44b, connection terminals 42c, 43c and 44c, and connection terminals 42d, 43d and 44d, those connection terminals being arranged on straight lines extending from the center, respectively. The sets of the linearly arranged connection are at 90 degrees with respect to each other. Of these connection terminals, the connection terminals 42a, 42b, 42c and 42d are arranged on a concentric circuit and electrically connected with each other within an assembly block. In a similar manner, the connection terminals 43a, 43b, 43c and 43d, and 44a, 44b, 44c and 44d are respectively arranged on a concentric circuit and electrically connected with each other within the assembly block. As shown in FIG. 7(b), the respective connection terminals are pressed by the springs 26 so as to project from the back surface within the insulation case 35, which reliably establishes electrical connection upon direct contact with another connector. Since the assembly block shown in FIG. 1 is linked in any one of the directions which are revolved 90 degrees each around the center line C as described earlier, each connection terminal is electrically connected with any one of the connection terminals which are linearly arranged at 90 degrees on the circumference of other assembly block which is linked to the assembly block shown in FIG. 1.

Figure 8A:
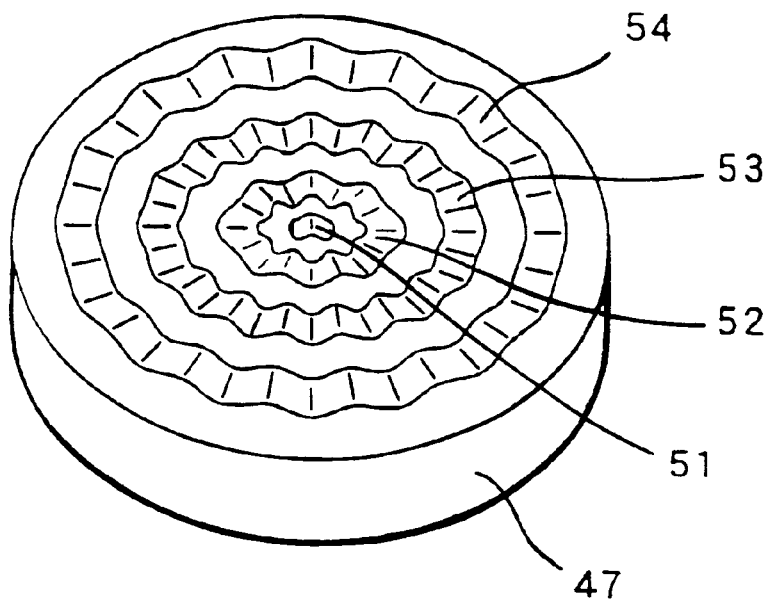
FIGS. 8(a) and 8(b) are a perspective view and a cross-sectional view, respectively, of yet another preferred embodiment of the connector.
Figure 8B:
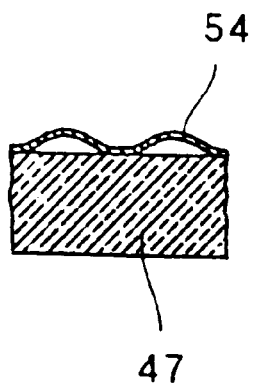

FIGS. 8(a) and 8(b) are a perspective view and a cross-sectional view, respectively, of yet another preferred embodiment of the connector. In the connector according to this embodiment, corrugated sheet-like connection terminals 51, 52, 53 and 54 are arranged in a concentric arrangement on an insulation plate 47. Since the connection terminals 51, 52, 53 and 54 are each formed like a corrugated sheet, when an assembly block is linked to another assembly block, electrical connection with the connection terminals of the other assembly block is realized without fail.

Figure 9:
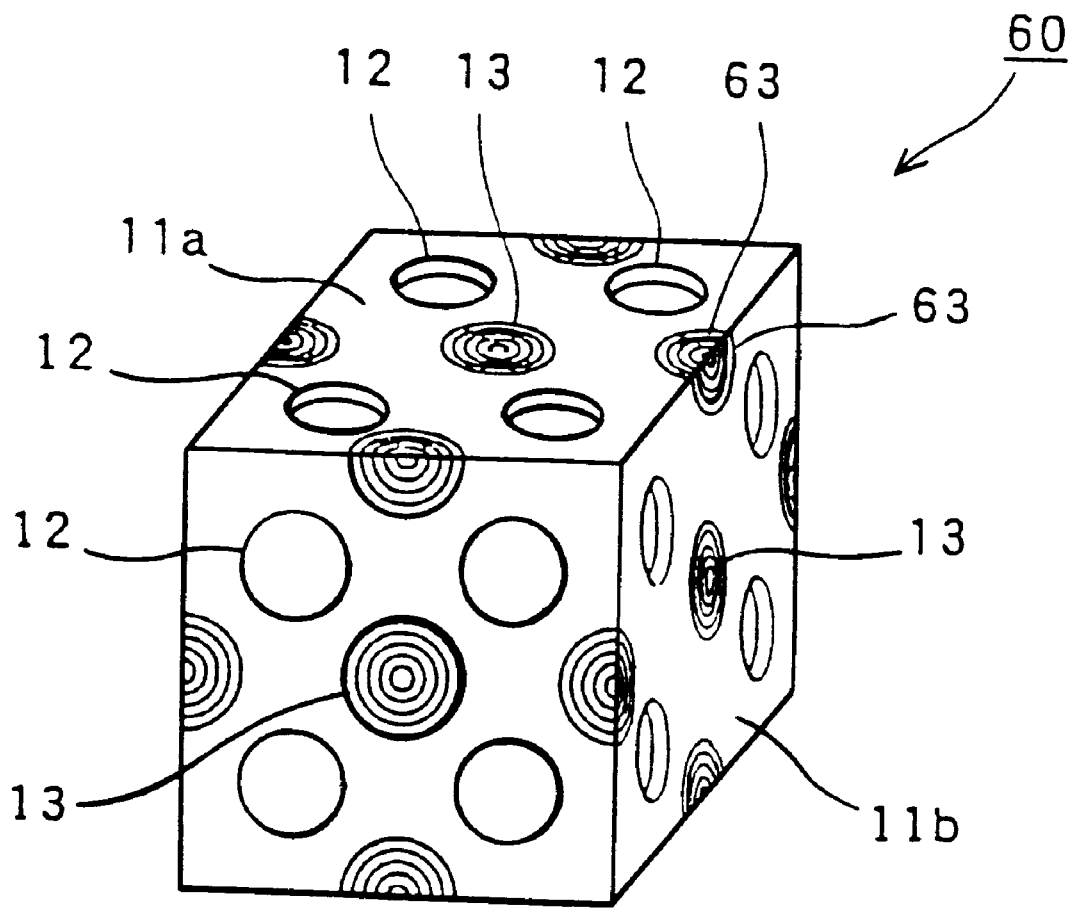
FIG. 9 is a perspective view of an assembly block according to a further preferred embodiment of the present invention.

FIG. 9 is a perspective view of an assembly block 60 according to a still further preferred embodiment of the present invention. The assembly block 60 according to this embodiment is similar to the connector 13 of the assembly block which is shown in FIG. 1, as it is with hemicycle-shaped connectors 63, 63 formed at a corner of two adjacent link surfaces. The two adjacent hemicycle-shaped connectors 63 are independent of each other, and are respectively electrically connected with hemicycle-shaped connectors of other assembly block which is linked at the link surfaces 11a and 11b.

Figure 10:
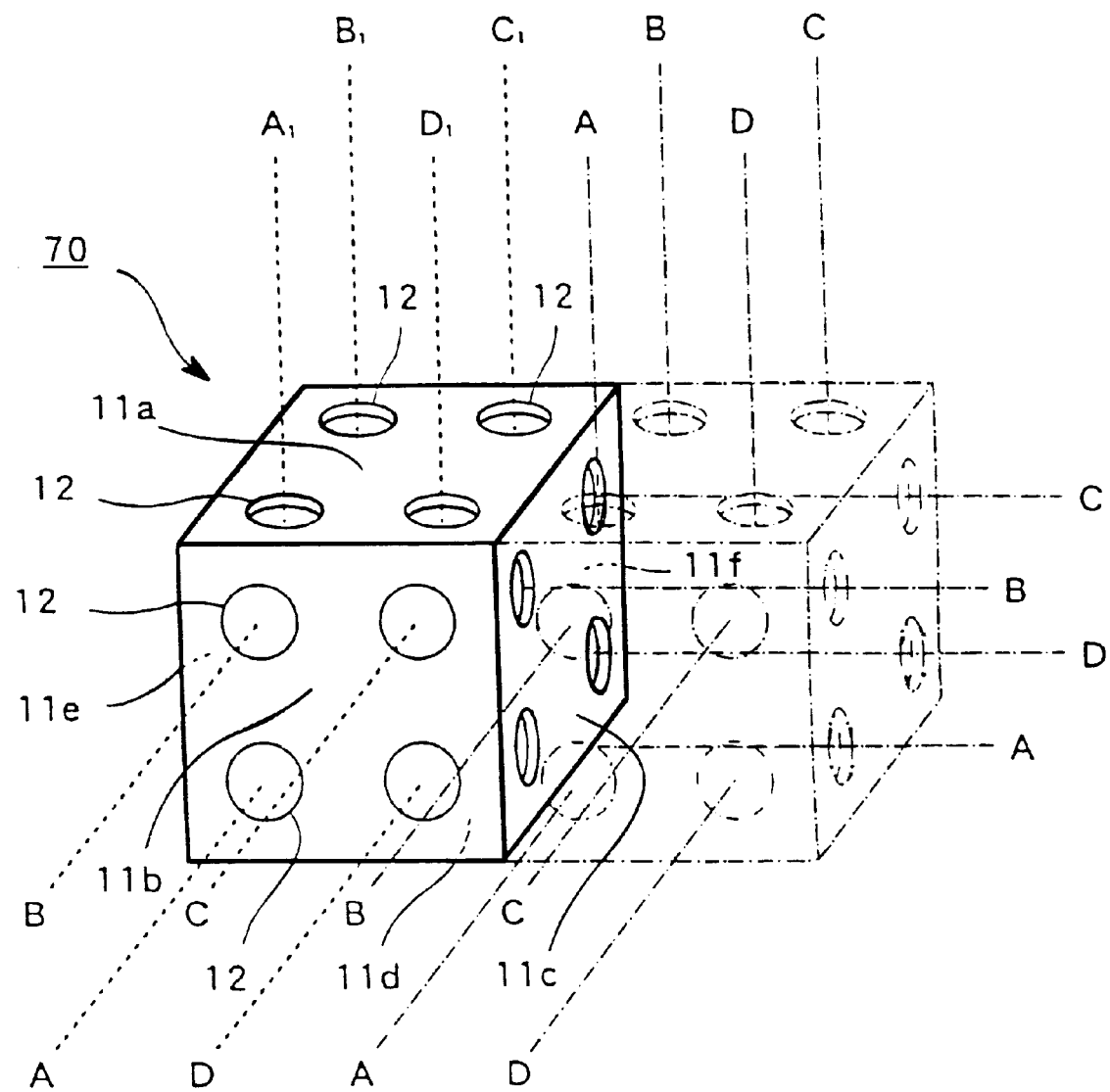
FIG. 10 is a perspective view of an assembly block according to a yet another preferred embodiment of the present invention.
Figure 11:
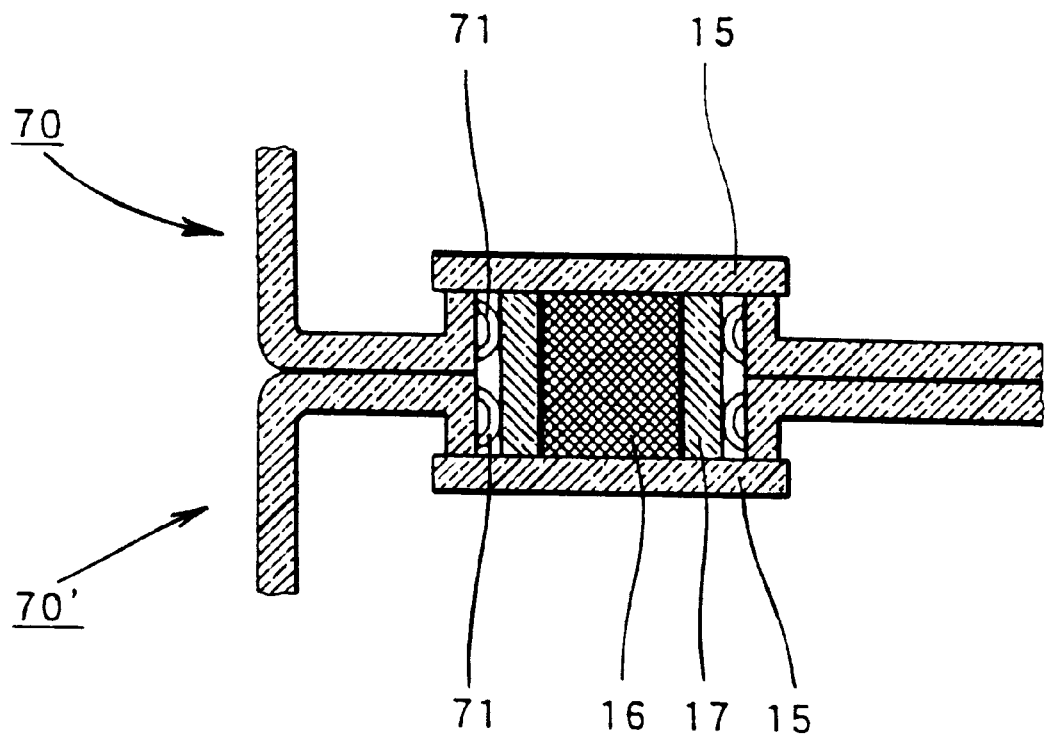
FIG. 11 is a cross-sectional view showing an area near link recess portions which are faced each other as they are linked to each other.

FIG. 10 is a perspective view of an assembly block according to yet another preferred embodiment of the present invention. The assembly block 70 according to this embodiment is different from the assembly blocks which are shown in FIGS. 1 and 9 in that the assembly block 70 does not comprise the connector 13 which comprises the connection terminals arranged in a concentric arrangement. With the assembly block 70 according to this embodiment, electrical connection with wire lines of another assembly block is ensured by means of the link recess portions 12. FIG. 11 is a cross-sectional view showing an area near the link recess portions 12, 12 which are faced to each other as they are linked to each other. As in the preferred embodiment which is shown in FIG. 2, the bottom plates 15 of steel are disposed at the bottom of the respective link recess portions 12, and as the magnet 16 which is disposed within the steel cylinder 17 is attracted to the bottom plates 15, two assembly blocks 70 and 70' are linked to each other. In the assembly block 70 according to this embodiment, with the cylinder 17 and the magnet 16 housed in the link recess portions 12, 12 which are faced with each other, conductive claws 71, 71 pressingly contacting the cylinder 17 are disposed in the associated link recess portions 12. The conductive claws 71, 71 are electrically connected with wire lines which are disposed within the assembly blocks 70 and 70'. Electric connection between the wire lines which are disposed within the assembly block 70 and the wire lines which are disposed within the assembly block 70' is realized through one of conductive claws 71, the cylinder 17 and the other conductive claws 71. Hence, in the preferred embodiment, connecting means is formed by one conductive claws 71, the cylinder 17 and the other conductive claws 71.

Figure 12:
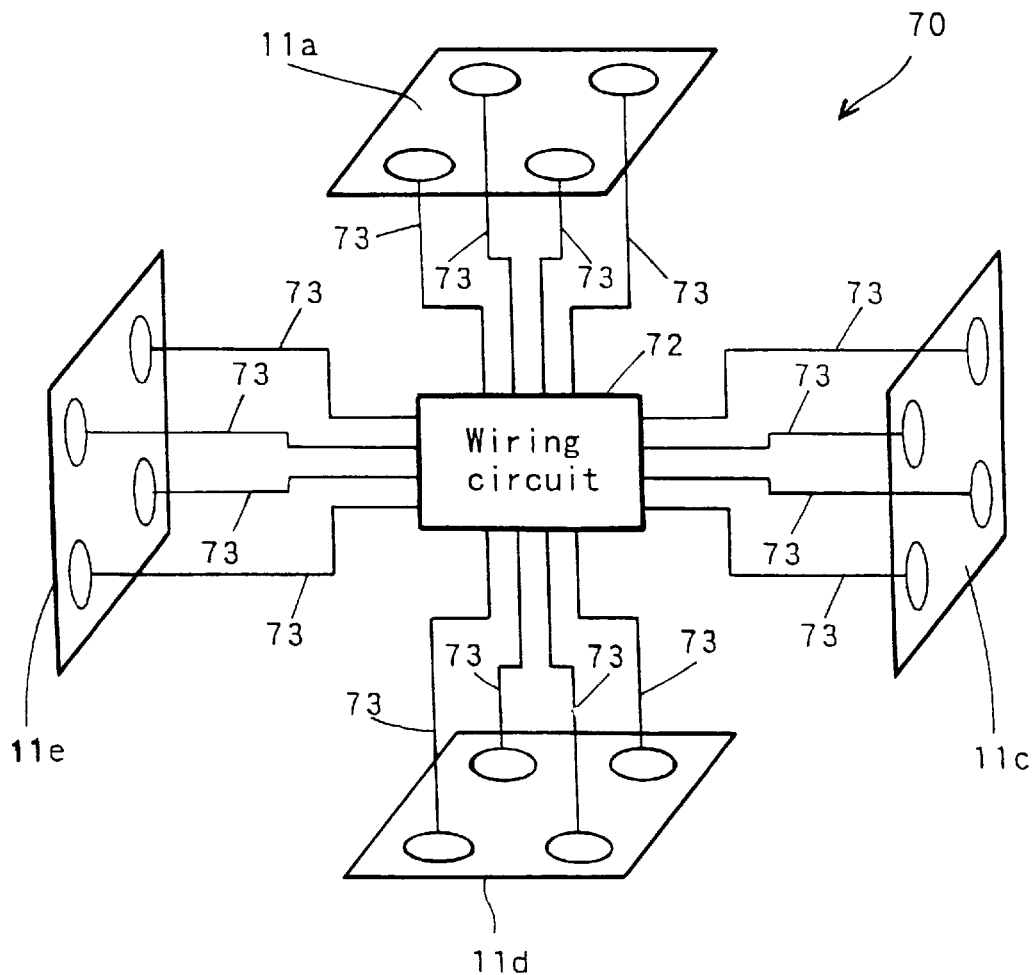
FIG. 12 is a schematic diagram of a wiring circuit according to the preferred embodiment of the present invention.

Since the assembly block 70 according to this embodiment must be able to be linked to other similar assembly blocks at any position and in any direction as far as the link recess portions 12 are faced with each other at that position, it is necessary that the wire each other at that position, it is necessary that the wire lines disposed within the assembly block as well are correctly connected with the wire lines which are disposed within other assembly block at any position and in any direction. To this end, the assembly block 70 according to this embodiment comprises a wiring circuit 72 as that shown in FIG. 12. In the preferred embodiment, the wiring circuit 72 serves as wiring means. From the wiring circuit 72, wire lines 73, 73 . . . extend which are to be connected with the conductive claws 71 of the respective link recess portions 12 of the respective link surfaces 11a through 11f, as shown in FIG. 12 (FIG. 12 omits the link surfaces 11b and 11f). The wiring circuit 72 has a function of connecting the wire lines 73, 73 in accordance with the functions of these wire lines.

Figure 13:
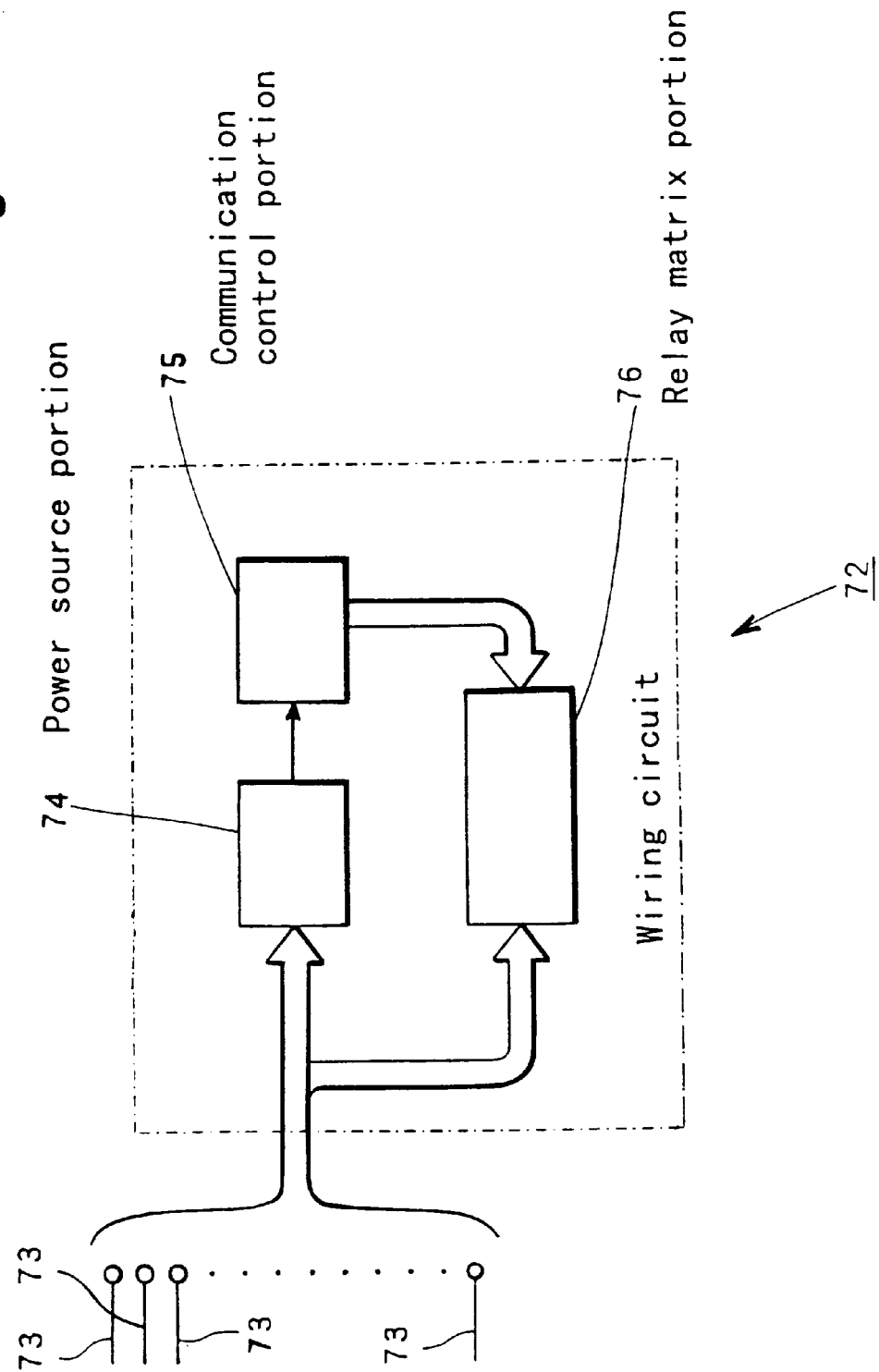
FIG. 13 is a block circuitry diagram of the wiring circuit.

More specifically, the wiring circuit 72 according to this embodiment comprises a block circuit as that shown in FIG. 13 which comprises a power source portion 74, a communication control portion 75 and a relay matrix portion 76. The wire lines 73, 73 of the respective link surfaces 11a through 11f are respectively connected with the power source portion 74 and the relay matrix portion 76. For the convenience of explanation, it is herein assumed that the assembly block 70 receives electric power and information from other assembly blocks through the link surface 11a and two wire lines are used as power source lines and another two wire lines are used at network lines. First, as the assembly blocks are linked to each other in the manner which is shown in FIG. 11, the power source portion 74 determines through which of the wire lines 73, 73 electric power is supplied, that is, which wire lines serve as power source lines, and electric power is supplied through the identified power source lines. Next, the power source portion 74 supplies electric power to the communication control portion 75, whereby the communication control portion 75 starts operating. Starting operations, the communication control portion 75 demands the relay matrix portion 76 to recognize which one of the wire lines extending from the link surface 11a serve as power source lines and which wire lines serve as network lines. In this example, power source lines are located at lines which are denoted at $A_1$ and $B_1$ in FIG. 10 and network lines are located at lines which are denoted at $C_1$ and $D_1$ in FIG. 10.

Figure 14:
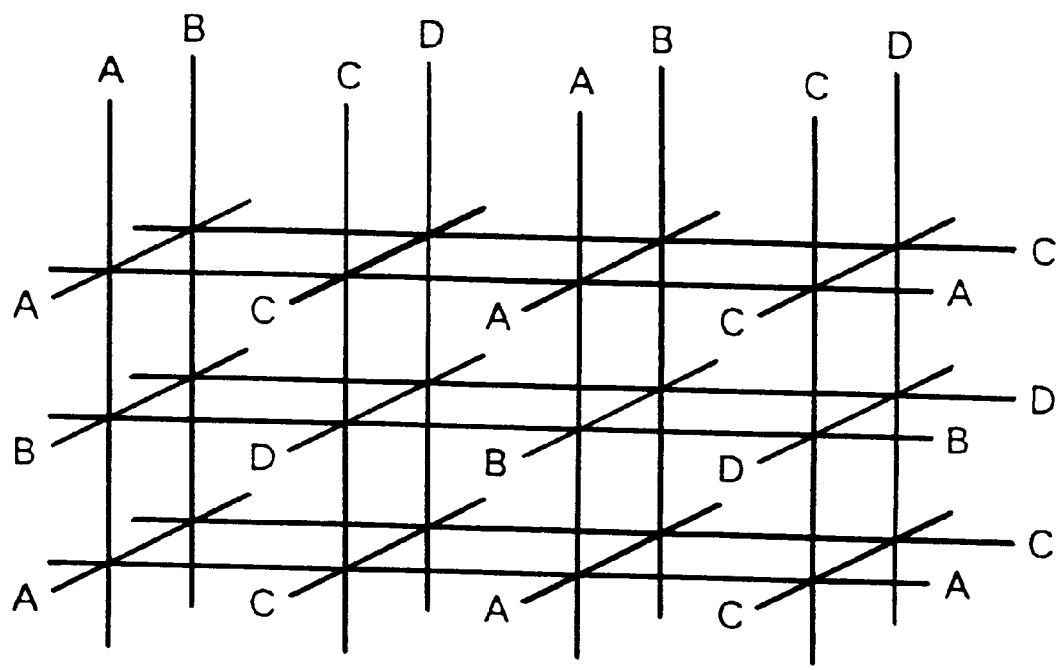
FIG. 14. is a conceptual view showing a space lattice of FIG. 10.

After recognizing the power source lines and the network lines, the relay matrix portion 76 (FIG. 13) sets the functions of the respective wire lines which extend to the link surfaces 11b through 11f except for the link surface 11a. More particularly, the relay matrix portion 76 sets the functions such that two of the four wire lines 73, 73 (FIG. 12) which extend to the link surfaces 11b through 11f serve as power source lines and the remaining two serve as network lines. Which wire lines are to be power source lines and which wire lines are to be network lines is determined in accordance with a logical space lattice which is illustrated with dotted lines A through D in FIG. 10, for example. In FIG. 10, two of the lines A, B, C and D run parallel to each other along each one of coordinate directions which intersect with each other in the three-dimensional space, and the functions are set such that the lines A and B (the lines $A_1$ and $B_1$ on the link surface 11a) become power source lines while the lines C and D (the lines $C_1$ and $D_1$ on the link surface 11a) become network lines. FIG. 14 shows only the space lattice of FIG. 10. With such a space lattice assumed, whatever the size of the assembly block is, whichever location the assembly block is linked at and whichever direction the assembly block is linked in, as far as four or more link recess portions 12 are formed in each link surface, it is possible to correctly set the functions of the wire lines which are disposed within the assembly block such that some are correctly set as power source lines and others are correctly set as network lines.

While the respective preferred embodiments above have been described in relation to an example wherein four wire lines are disposed and two of the four function as power source lines while the other two function as network lines, the present invention is applicable to a structure in which two wire lines have a function as power source lines as well as a function as network lines. The present invention is further applicable to a structure in which of four wire lines, two function as both power source lines and network lines and the remaining two function as network lines for a separate system. Still further, the number of the wire lines is not limited to four. In addition, the present invention is applicable to other structures in which the functions of the wire lines are not limited to power source lines and network lines.

As described above, the assembly block according to the present invention comprises the wire lines which have predetermined functions such as transfer of electric power, information, etc., and the connector for connecting the wire line with wire lines of other assembly block, and the connector comprises the plurality of connection terminals which are arranged in a concentric arrangement, and therefore, it is possible to connect the connection terminals with each other, whichever direction the assembly block is linked in.

Further, the assembly block according to the present invention comprises the wiring means, and the wiring means judges with which functions of the wire lines of the other assembly block the connecting means and the wire lines are connected and thereafter connection of the wire lines within the assembly block is established. Hence, it is possible to correctly connect the wire lines within the assembly block which are connected with the wire lines of other assembly blocks, whichever location the assembly block is linked at and whichever direction the assembly block is linked in.

What is claimed is:

1. An assembly block for a teaching material and a plaything, comprising:

at least one link surface for link to another assembly block;

linking means which is disposed in said link surface, in order to link said assembly block to said other assembly block;

a plurality of wire lines inside the assembly block each having a predetermined function; and a connector for electrically connecting said wire lines inside the assembly block with the wire lines which are disposed in said other assembly block which is linked to said assembly block by said linking means, wherein said connector comprises a plurality of connection terminals which are arranged on concentric circles, and each of said plurality of wire lines inside the assembly block is electrically connected to one of said connection terminals.

2. The assembly block for a teaching material and a plaything of claim 1, wherein said link surface is formed in the shape of a square, and said connector is located at an intersection of diagonal lines of said square.

3. The assembly block for a teaching material and a plaything of claim 1, wherein said plurality of wire lines comprise at least two power source lines and at least two network lines.

4. The assembly block for a teaching material and a plaything of claim 1, wherein said connection terminals of said connector comprise pressing means.

5. The assembly block for a teaching material and a plaything of claim 1, wherein said connection terminals of said connector are disposed on concentric circles.

6. An assembly block for a teaching material and a plaything, comprising:

at least one link surface for link to another assembly block;

a plurality of wire lines inside the assembly block each having a predetermined function;

linking means which is disposed in said link surface, in order to link said assembly block to said other assembly block; and connecting means connected to said plurality of wires for electrically connecting said wire lines inside the assembly block with said wire lines which are disposed in said other assembly block, wherein said assembly block further comprises wiring means connected to said plurality of wires, which determines which of the functions of the wire lines of said other assembly block said wire lines are connected, and thereafter connects said wire lines within said assembly block to the wire lines of said other assembly block in accordance with the determination.

7. The assembly block for a teaching material and a plaything of claim 6, wherein said link surface is formed in the shape of a square, and said connecting means is located at an intersection of diagonal lines of said square.

8. The assembly block for a teaching material and a plaything of claim 6, wherein said plurality of wire lines comprise at least two power source lines and at least two network lines.

9. The assembly block for a teaching material and a plaything of claim 6, wherein said connection terminals of said connecting means comprise pressing means.

10. The assembly block for a teaching material and a plaything of claim 6, wherein said connection terminals of said connecting means are disposed on concentric circles.

11. The assembly block for a teaching material and a plaything of claim 6, wherein said wiring means connects said wire lines within said assembly block with the wire lines of said other assembly block in accordance with a logical space lattice.

* * * * *